Feb. 21, 1967  F. A. JACKSON  3,304,701
LAWN MOWER
Filed Sept. 1, 1964  2 Sheets-Sheet 1
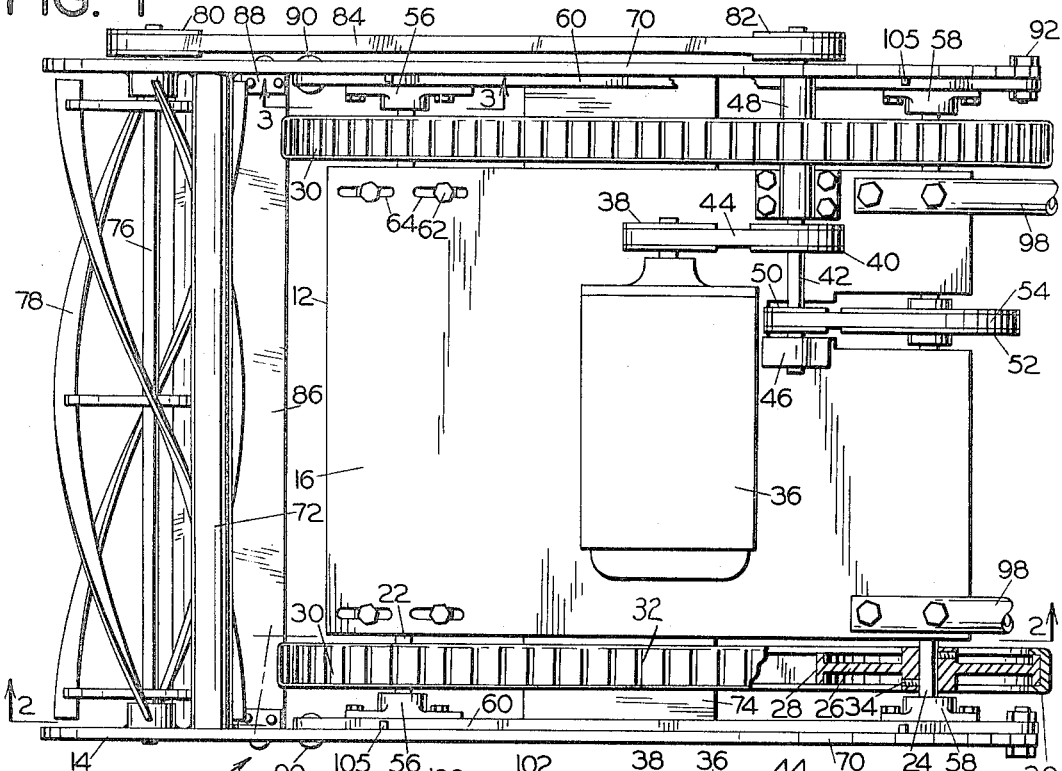
FIG. 1
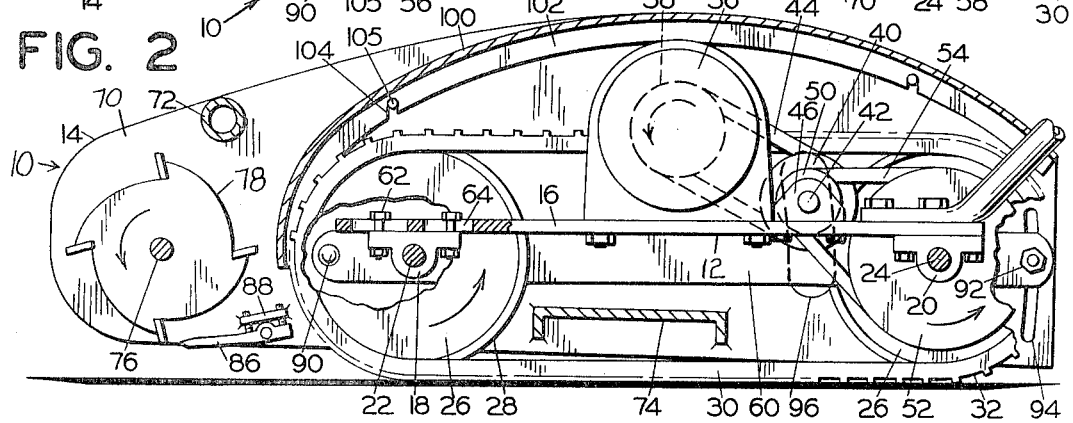
FIG. 2
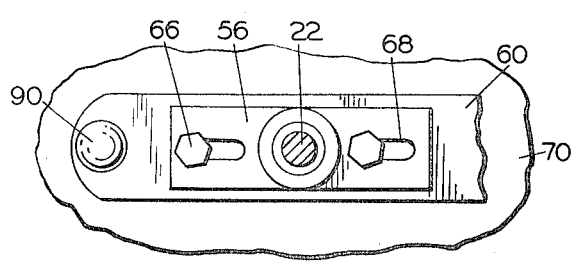
FIG. 3
FIG. 7
INVENTOR.
FORREST A. JACKSON
BY Eugene M. Eckelman
ATTORNEY

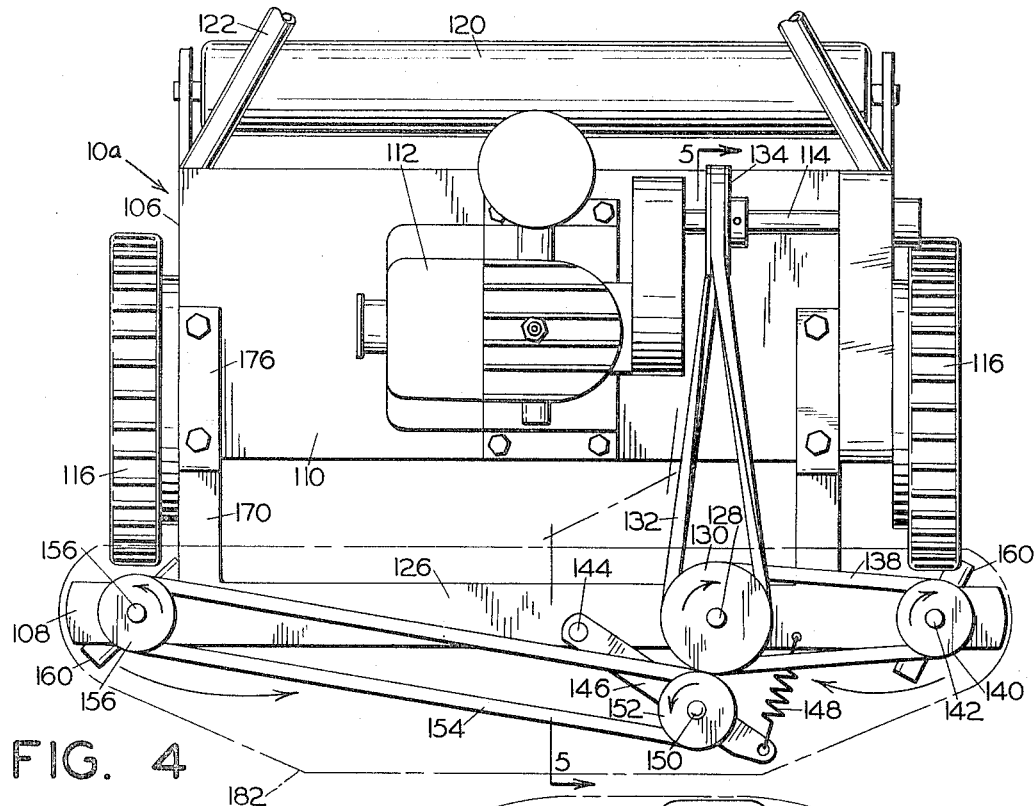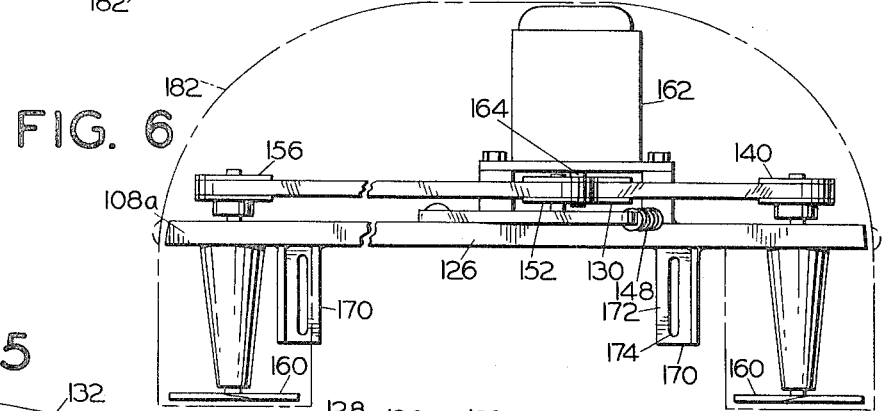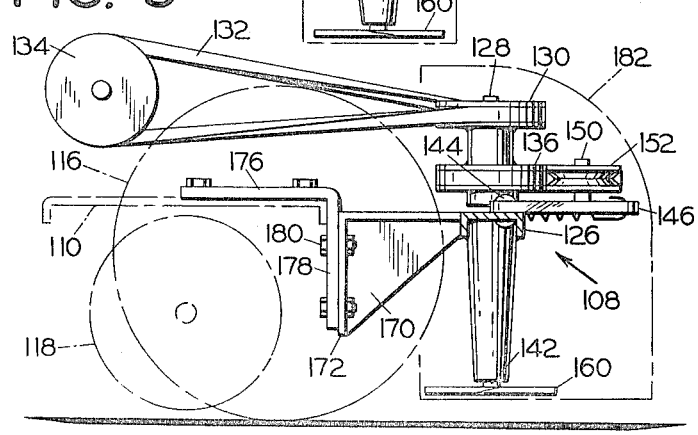

United States Patent Office 3,304,701
Patented Feb. 21, 1967

3,304,701
LAWN MOWER
Forrest A. Jackson, 5417 2nd Ave. S., Apt. C,
Seattle, Wash. 98108
Filed Sept. 1, 1964, Ser. No. 393,570
1 Claim. (Cl. 56—26)

This invention pertains to lawn mower constructions.

In present day lawn mower constructions the cutting means thereof, which may comprise a reel or rotary type blade, are of less width than the wheel span of the mower. Thus, in cutting a lawn, one of the wheels of the mower always rolls on uncut grass and presses the later down. Since the grass does not spring back before the mower makes the next pass, a good cut is not accomplished on the said next pass of the lawn mower. When the grass in the tracks of the lawn mower finally does spring up, ridges of uncut grass will appear in the lawn.

It is an object of the present invention to provide a lawn mower having a structural arrangement wherein grass cutting means are disposed in front of the wheels in order that the grass will be cut ahead of the wheels.

More particular objects of the present invention are to provide in a first embodiment a novel arrangement of main frame and cutter support frame wherein the latter supports cutting means directly in front of the lawn mower wheels; and also to provide a novel arrangement of main frame and cutter support frame wherein the latter is adjustable on the main frame to vary the cutting height of a cutter head on said frame.

Another object is to provide a second embodiment which employs a pair of auxiliary cutters disposed forwardly of the mower immediately in front of the wheels; and furthermore to provide such individual cutters of a structure adapted for attachment to a conventional existing lawn mower.

Another object is to provide a lawn mower construction of the type described employing a driving mechanism which includes continuous, cleated, flexible tracks operating over pairs of track wheels.

Additional objects will become apparent from the following specification and claims, considered together with the accompanying drawings, wherein the numerals of reference indicate like parts.

In the drawings:

FIGURE 1 is a plan view of a first embodiment employing principles of the present invention;

FIGURE 2 is an offset, longitudinal, sectional view taken on the line 2—2 of FIGURE 1;

FIGURE 3 is an enlarged, fragmentary, sectional view taken on the line 3—3 of FIGURE 1;

FIGURE 4 is a top plan view of a second embodiment of the invention;

FIGURE 5 is an offset, longitudinal, sectional view taken on the line 5—5 of FIGURE 4;

FIGURE 6 is a front elevational view of a modified form of the second embodiment; and FIGURE 7 is a front elevational view of a further modified form of said second embodiment.

Referring first to the embodiment of FIGURE 1, the present invention is embodied in a lawn mower construction designated generally by the numeral 10. This lawn mower comprises essentially a main frame 12 and a cutter support frame 14. The main frame 12 includes a top plate 16, FIGURES 1 and 2, having secured to its undersurface a pair of forward bearings 18 and a pair of rearward bearings 20. Journaled in the bearings 18 and 20 are front and rear shafts 22 and 24, respectively.

Mounted on the shafts 22 and 24 are pairs of wheels 26 having an outer flanged portion 28 adapted to receive continuous, channel shaped, flexible members 30. These track members are mounted on longitudinally aligned pairs of said front and rear wheels, and have a cleated surface 32 for establishing a good drive connection with the ground.

The rear shaft 24 comprises a drive shaft, and for this purpose the rear wheels 26 are secured thereto, as by set screws 34. Shaft 24 is driven by a power unit 36, such as an electric motor, supported on the upper surface of the top plate 16. To establish a drive connection between the motor 36 and the shaft 24, the motor 36 has a drive pulley 38 on its output shaft which in turn drives a pulley 40 on an auxiliary shaft 42 by means of a drive belt 44. Shaft 42 is journaled at one of its ends in a bearing 46 and at its other end in an elongated bearing bushing 48, the said bearings 46 and 48 being suitably secured to the plate 16. Secured on the shaft 42 is a second pulley 50 which drives a pulley 52 secured on the rear shaft 24, the drive connection between pulleys 50 and 52 being established by a belt 54.

The shafts 22 and 24 project laterally beyond the wheels 26 and terminate in front bearings 56 and rear bearings 58, respectively. The bearings 56 and 58 are secured to side bars 60 the purpose of which will be described hereinafter.

The attachment of the bearings 18 to the plate 16 comprises a longitudinally adjustable one, and for this purpose attaching screws 62 are adjustably secured to said bearings and project through longitudinally disposed slots 64 in the plate. The attachment of the bearings 56 to the side bars 60 is also a longitudinally adjustable one wherein attaching screws 66 for the bearings 56, FIGURE 3, project through longitudinally disposed slots 68 in said bushings and are suitably threadably engaged in the side bars 60. It is apparent that upon loosening the attaching screws 62 and 66, the front shaft 22 is adjustable forwardly and rearwardly of the mower to tighten or loosen the track 30 as desired.

The cutter support frame 14 is supported by the main frame 12 and has a pair of side plates 70 extending along the outer side of the side bars 60. These side plates are integrally connected together by a front cross bar 72 and an intermediate frame member 74 and, FIGURE 2, project beyond the forward end of the main frame 12 and the front wheels. Rotatably supported on the forward projecting portion of the plates 70 is a shaft 76 for a cutter reel 78. One end of the shaft 76 projects beyond one of the side plates 70 and has a pulley 80 secured thereto. One end of auxiliary shaft 42 also projects beyond this same side plate 70 and has a pulley 82 secured thereto for driving a belt 84 engageable with the pulley 80 on the reel shaft. Thus, operation of the motor 36 simultaneously drives the wheel shaft 24 and the reel shaft 76.

Reel 78 is associated with a cutter bar 86 suitably secured to the side plates 70 and having conventional adjusting means 88 associated therewith.

It is desirable that the reel have vertical adjustment relative to the ground, and for this purpose such adjustment is accomplished in the means which attach the side plates 70 to the main frame supported side bars 60. Such attaching means comprises a pivot connection 90 between the said side plates 70 and the side bars 60 adjacent the front of the latter. The attachment between the plates 70 and the side bars 60 at the rearward end thereof comprises a vertically adjustable attachment wherein screws 92 are mounted in suitable apertures in the bar 60 and project through elongated vertical slots 94 in the side plates. By loosening the screws 92 the cutter support frame 14 is adapted for pivoting on the forward pivot connection 90 which serves to raise or lower the reel 78 to the desired level. Screws 92 are tightened when the proper adjustment is accomplished to maintain the reel in its selected set position. Since the bearing bushing 48 projects outwardly beyond the one side plate, the latter has a vertical slot 96 therein which receives the bushing and which permits vertical adjustment of the reel support frame.

The lawn mower has suitable handle members 98 secured to the top plate 16.

As best seen in FIGURE 1, the cutter reel 78 is in front of and cuts a swath wider than the wheels. Thus, grass is cut before it can be pressed down by the wheels and a uniform cutting of the lawn is accomplished.

A cover 100 for the main frame portion may be mounted on the mower, FIGURE 3. This cover has side walls 102 extending partly down the side of the main frame portion, and the side walls have notches 104 for receiving short pins 105 integrated with the side plates 70 of the reel support frame and for holding the cover 100 detachably on the mower. Cover 100 also serves as a safety hood. This cover has been removed in FIGURE 1 for better illustrating other parts of the lawn mower.

A second form of lawn mower, designated by the numeral 10a and embodying principles of the persent invention, is shown in FIGURES 4 and 5. This embodiment employs a main frame 106 and an auxiliary cutter frame 108. Main frame 106 has a top plate 110 on which is mounted a gasoline motor 112 operating a drive shaft 114. This type of mower is of conventional structure and employs power driven wheels 116, a power driven cutter reel 118, FIGURE 5, a rear roller 120, and handle members 122.

The auxiliary cutter frame 108 has a cross bar 126 in which is journaled a vertical shaft 128. Secured to the shaft 128 is a pulley 130 driven by a belt 132 in turn driven by a pulley 134 secured to drive shaft 114. Also secured to vertical shaft 128 below the pulley 130 is a pulley 136, FIGURE 5, which drives a belt 138 also engageable with a pulley 140 on a vertical shaft 142. The shaft 142 is journaled in the cross bar 126 adjacent one end of the latter in longitudinal alignment with one of the wheels 16 of the mower.

Pivotally mounted on the cross bar 126 by pivot means 144 is a tension arm 146 biased toward the pulley 130 by a tension spring 148 connected between the cross bar 126 and the free end of the said arm 146. The tension arm 146 integrally supports a vertical shaft 150 to which is secured a pulley 152. The pulley 152 is driven by a belt 154 also operating on a pulley 156 on a vertical shaft 158 journaled in the cross bar 126 at the end opposite from shaft 142. The pulley 152 is horizontally aligned with pulley 130 and its belt 154 forcefully engages the belt 132 by reason of spring 148 to establish a frictional drive between said belts to rotate shaft 158. Secured to the bottom end of shafts 142 and 158 are cutter blades 160, such blades being disposed longitudinally in front of wheels 116.

FIGURE 6 shows a modification of the structure of FIGURE 4 wherein motor means 162, such as an electric motor, is mounted directly on the auxiliary cutter frame 108a and the output shaft 164 thereof is used in lieu of shaft 128 in FIGURE 4. More particularly shaft 164 carries and drives the pulleys 130 and 136. The other pulleys 140, 152, and 156, as well as other structure for driving the cuter blades 160, are identical to that of FIGURE 4.

FIGURE 7 shows another form of auxiliary cutter frame, designated by the refernce numeral 108b. In this construction there is similarly employed a cross bar 126 but individual drive motors 166 are provided for the cutter blades 160, the motors being mounted in vertical dis-position and their drive shafts being extended downwardly through suitable bushings 168 secured to the cross bar 126.

For mounting each of the cutter frames 108, 108a, or 108b on the lawn mower structure 10a, the cross bars 126 have a pair of right angle brackets 170 secured integrally thereto in rearwardly projecting relation. A vertical portion 172 of these brackets has a vertical slot. Secured to the top plate 110 of the mower is a pair of right angle brackets 176 each having a down turned end 178 to which the vertical portion of brackets 170 is secured. Such securement is accomplished by screws 180 projecting through suitable apertures in the bracket portions 178 and passing freely through the slots 174. By this mounting arrangement, the auxiliary cutter frame 108 is secured to the lawn mower and is vertically adjustable in its mounting to position the cutter blades 160 at the desired height.

Any suitable covering may be provided for the auxiliary cutter frame 108, 108a, and 108b as illustrated in phantom lines in FIGURES 4, 5 and 6 and designated generally by the numeral 182.

In the embodiments of FIGURES 4, 6 and 7, it is preferred that the blades 160 rotate in opposite directions and particularly in such directions that each throws the grass inwardly of the mower. The directions of rotation of the blades 160 and pulleys 130, 140, 152, and 156 is illustrated by arrows in FIGURE 4. In the FIGURE 7 embodiment, the motors 166 will have opposite directions of rotation. It is to be understood, however, that the blades 160 may be caused to rotate in the same direction by a suitable arrangement of pulleys or motors.

In accordance with the present invention, there is provided a lawn mower which provides cutter means in front of the wheels so that the wheels cannot press down grass not yet cut. A smooth cutting function of lawns is thus accomplished by the present invention. It is to be understood that the forms of my invention herein shown and described are to be taken as preferred examples of the same and that variouse changes in the shape, size and arrangement of parts may be resorted to without departing from the spirit of my invention or the scope of the subjoined claims.

Having thus described my invention, I claim:

A lawn mower construction comprising a main frame, a pair of forward supporting wheels and a pair of rearward supporting wheels, a continuous, cleated, longitudinally disposed track member operative on longitudinally aligned sets of said forward and rearward supporting wheels, an elongated side bar secured to said main frame at each side thereof, a side plate extending along the outer side of each of said side bars and projecting forwardly of said side bars, pivot means pivotally attaching said side plates to said side bars adjacent the forward end of said side bars, a vertically adjustable connection between said side bars and respective ones of said side plates at the rearward end of said side bars whereby the forward end of said side plates is adapted to be raised and lowered relative to the lawn mower supporting wheels upon vertical adjustment of said side plates relative to said side bars, transversely extending cutter means rotatably supported on the forward end of said side plates, said cuter means being disposed forwardly of the lawn mower supoprting wheels, and power drive means operably connected to said wheels and said cutter means for driving the same.

References Cited by the Examiner

UNITED STATES PATENTS

| | | | |
|---|---|---|---|
| 9,138 | 7/1852 | Manning | 56—255 |
| 851,901 | 4/1907 | Sherrard | 56—255 |
| 977,569 | 12/1910 | Streibich | 56—238 |
| 1,546,088 | 7/1925 | Landon | 56—255 |

(Other references on following page)

UNITED STATES PATENTS

| | | | |
|---|---|---|---|
| 2,071,872 | 10/1934 | Cockburn | 56—25.4 |
| 2,104,719 | 1/1938 | Pol et al. | 56—7 |
| 2,193,712 | 3/1940 | Campbell | 56—238 |
| 2,521,262 | 9/1950 | Smith | 56—26 |
| 2,622,384 | 12/1952 | Velotta | 56—251 |
| 2,674,837 | 4/1954 | Buck | 56—26 |
| 2,696,705 | 12/1954 | Greber | 56—26 |
| 2,776,533 | 1/1957 | Yacoby | 56—26 |
| 2,908,127 | 10/1959 | Craig | 56—26 |
| 3,152,431 | 10/1964 | Ott et al. | 56—6 X |

FOREIGN PATENTS 130,450  12/7948  Australia.

ABRAHAM G. STONE, *Primary Examiner.*

RUSSELL R. KINSEY, J. O. BOLT, *Assistant Examiners.*